(12) United States Patent
Herrmann

(10) Patent No.: US 7,316,197 B2
(45) Date of Patent: Jan. 8, 2008

(54) COMPOSITE WALL STRUCTURE

(76) Inventor: Robert M Herrmann, 5202 Moceri La., Grand Blanc, MI (US) 48439

( * ) Notice: Subject to any disclaimer, the term of this patent is extended or adjusted under 35 U.S.C. 154(b) by 37 days.

(21) Appl. No.: 11/297,043

(22) Filed: Dec. 8, 2005

(65) Prior Publication Data
US 2006/0117675 A1    Jun. 8, 2006

Related U.S. Application Data

(60) Provisional application No. 60/634,320, filed on Dec. 8, 2004.

(51) Int. Cl.
*B63G 8/00* (2006.01)
(52) U.S. Cl. .................................. 114/312; 52/81.1
(58) Field of Classification Search ................ 114/264, 114/267, 312; 52/81.1
See application file for complete search history.

(56) References Cited

U.S. PATENT DOCUMENTS 2,979,064 A * 4/1961 Fischer ..................... 52/81.4

6,532,886 B2 * 3/2003 McNamara et al. ........ 114/312

\* cited by examiner

*Primary Examiner*—Lars A. Olson
(74) *Attorney, Agent, or Firm*—The Weintraub Group, PLC

(57) ABSTRACT

A composite wall structure for use in a building, such as a geodesic dome, or the outer hull of a pressurized vehicle, such as an airship or submarine, is formed by interconnecting a plurality of three dimensional triangular shaped cells into a shape of desired contour, such as planar or curved, with each individual cell having a sealed chamber that is pressurized, and securing a fluid impervious closure skin to the connected array of cells. Each cell is formed by connecting planar rectangular sidewalls into a triangular frame having opposite sides and attaching a planar triangular panel to each side of the frame in a manner to form a pressure sealed chamber. The hull structure of predetermined shape is capable of captivating a volume of air and/or resisting buckling or failure resulting from fluid pressure on the hull during operation in air or water environments.

15 Claims, 3 Drawing Sheets

COMPOSITE WALL STRUCTURE

CROSS-REFERENCE TO RELATED APPLICATIONS

This application is a completion application of co-pending U.S. Provisional Patent Application Ser. No. 60/634,320, filed Dec. 8, 2004, the disclosure of which is hereby incorporated by reference.

BACKGROUND OF THE INVENTION

1. Field of the Invention

The present invention pertains to a wall structure for a building, such as used to form a geodesic dome, and more particularly, to a composite wall structure and method wherein structural elements are interconnected to one another and into an array of triangular shaped compartments that are interiorly pressurized. Even more particularly, the invention pertains to a composite structure for the hull of a pressurized vehicle, such as an airship or submarine, wherein an array of internally pressurized compartments is connected to a fluid impervious closure skin to form a hull structure of predetermined shape and capable of captivating a volume of air and/or resisting buckling or failure resulting from fluid pressure on the hull during operation in air or water environments.

2. Description of Related Art

Interconnecting a plurality of rods, beams, struts and like structural elements to one another and forming a spherical dome is known. In general, the opposite ends of these structural elements are connected wherein to form an array of wall elements of like geometrical shape, such as a triangle and a hexagon.

By way of example, reference is drawn to U.S. Pat. No. 6,295,785, "Geodesic Dome and Method of Constructing Same" issuing Oct. 2, 2001 to the Applicant herein. The '785 Patent is specifically incorporated herein in its entirety.

In general, the geodesic dome is an almost spherical structure based on a network of struts arranged on great circles (geodesics) lying on the surface of a sphere. The geodesics intersect to form triangular elements that create local triangular rigidity and distribute the stress. The triangles create a self-bracing framework that gives structural strength while using a minimum of material. The geodesic dome is efficient, inexpensive and durable. A sphere is already efficient in that it encloses the most volume with the least surface. Thus, any dome that is a portion of a sphere has the least surface through which to lose heat or intercept potentially damaging winds.

Further, of all known structures, a geodesic dome has the highest ratio of enclosed area to weight. Geodesic domes are far stronger as units than the individual struts would suggest. The sub-pattern of triangles bulges out so that their vertices lie in the surface of a sphere and create great circles ("geodesics") to distribute stress across the structure.

There is, however, an ongoing need for improvements in the method and structure used in constructing geodesic domes and like-shaped buildings, such as those described in U.S. Pat. No. 6,295,785. For example, a strengthened less costly polyhedral structure would be beneficial in that such structure could be used to support the downward weight of an even larger dome.

The structure of the geodesic dome must be designed to withstand dynamic forces, such as those occasioned by earth tremors and imposed by wind. A strong lightweight polyhedral structure is believed desirable in building a domed structure in an earthquake prone region, both for resisting forces arising from a vertical shock and planar earth shifting force. Typically, wind forces are applied on only one side of the dome or in one horizontal direction, not simultaneously 360° about the entire exterior of the dome. As such, the triangular elements of the polyhedral structure must ultimately be able to withstand wind forces placed anywhere on the dome.

There is reason to believe that the concept used in the construction of the geodesic dome can be effectively extended to any shape, although it works best in shapes that lack corners to concentrate stress. For example, a logical extension of the concepts employed in constructing a dome are extendable to the outer wall of a vehicle operated at a high altitude, such as a rigid lighter that air airship, or a boat operating at least in part atop the water, or operating at an extended depth below the water.

In the case of the submarine, the hull structure includes outer and inner hulls, which form a ballast tank that is fillable with water, and forms a pressurized interior compartment for personnel and equipment. The submarine can float because the weight of water that it displaces is equal to the weight of the ship. The displacement of water creates an upward force ("the buoyant force") that acts opposite to gravity, which would pull the ship down. When the ship is on the surface, the ballast tank is filled with air and the overall density is less than that of the surrounding water. To submerge, the ballast tanks are flooded with water and air in the ballast tank vented until its overall density is greater than the surrounding water. The outer hull must resist inward forces of the body of water, which surrounds the submarine, from collapsing the hull.

Similarly, the rigid airship includes an exterior envelope and an internal skeleton that maintains the shape of the airship and defines an interior cavity for containing a pressurized lighter than air lifting gas, such as helium or hydrogen. Similar to the submarine, the airship controls its buoyancy in the air. That is, the airship displaces a volume of air of the surrounding medium whose weight is equal or greater than the total weight of the immersed body. If the weight of the body is less than the displaced air, the body has positive buoyancy (i.e., rises). As the airship ascends, the lifting gas expands due to the reduction of the ambient pressure. The exterior sheet of the airship must maintain the shape; resist overpressure inside the airship hull as the airship rises.

Whether for use at a high altitude or deep submergence, the hull must maintain the shape and integrity of the vehicle hull. Desirably, the principles applied in the constructing a geodesic dome and like structures could be applied to a vehicle operated at high altitudes and/or a great depths below the sea, wherein the hull is subjected to a continuous 360° pressure

SUMMARY OF THE INVENTION

An object of this invention is the provision of an improved wall structure, such as for a geodesic dome and/or submersible and lighter than air vehicles.

A further object of this invention is the provision of improved wall structure that forms an enclosed interior and an exterior shape that conforms to the exterior of a vehicle movable in a fluid medium, such as air and water.

Another object of this invention is the provision of an improved composite hull structure for use as the outer shell of a vehicle subjected to exterior or interior pressure, such as a submarine or an airship, the composite hull structure being reinforced, substantially impervious to fluid penetration, and forming a sealed interior air chamber.

Another object of this invention is provision of an improved composite hull structure for a vehicle adapted to be encircled, or subjected at least in part, to a 360° pressure field, such as by a body of water acting on the hull of a submarine and like submersible, or by a body of pressurized air acting on the outer skin of an airship, dirigible, and like lighter than air vehicle.

Another object of this invention is the provision of pneumatically reinforced wall structure, which forms the exterior hull of a submarine, and resists hydrodynamic forces tending to buckle the hull when the submarine is at a great depth below the water surface.

Another object of this invention is the provision of a reinforced wall structure comprised, at least in part, of pneumatically pressurized triangulated structures.

Yet another object of this invention is provision of a substantially continuous wall structure formed, at least in part, by a plurality of sealed, internally pressurized, triangular shaped elements, wherein the outward pressure in the elements act to push adjacent triangular shaped elements against one another, distribute load, and strengthen the wall structure by opposing vertical loads on a structure formed using this wall structure.

According to this invention, a rigid wall structure comprises a plurality of planar generally rectangular shaped struts and planar generally triangular shaped wall panels that are connected to one another and into an array of triangularly shaped compartments, characterized in that each said compartment is individually sealed and internally pressurized.

Also and according to this invention, an improved composite wall structure, such as for a geodesic dome and/or submersible and lighter than air vehicle, comprises a sheet of fluid impervious material, a plurality of rectangular shaped planar struts and triangular shaped planar wall panels, means for connecting the struts and wall panels together and into an array of triangular shaped cells, each cell comprising the respective edges of a first and a second wall panel and the respective edges of three of said struts being connected to one another in a manner wherein to form a sealed chamber and characterized in that said chamber is internally pressurized, and means for connecting the array of triangular shaped cells to the sheet of fluid impervious material in a manner wherein the sheet is juxtaposed and in generally parallel relation against the array of first wall panels.

In another embodiment according to this invention, a vehicle that is submersible, at least in part, in water or is lighter than air comprises: a contoured outer hull having a central longitudinal axis and forward and aft ends disposed along the axis, said outer hull being adapted to enclose a volume of air or gas and be subjected to a normal pressure during operation in the air or water environment, said outer hull including a first wall impervious to fluid penetration and a second wall, the second wall comprising an array of triangular shaped elements, each individual triangular shaped element forming a sealed gas compartment pressurized to a predetermined level, first means for interconnecting the vertices of adjacent triangular shaped elements to one another, and second means for interconnecting the triangular shaped elements to the first wall of the vehicle.

According to an aspect of this embodiment of the invention, the triangular shaped element comprises two triangular shaped plates and three rectangular shaped struts, each strut extending between opposite end portions, means for connecting the opposite end portions of the struts to one another and in a manner wherein the opposite end portions of the struts form the vertices of a triangle when the struts are connected to one another, and means for joining the triangular shaped plates to the struts in a manner that the plates and struts form a respective sealed compartment that captivates the pressurized gas.

Preferably, the strut is elongated, generally planar, and has upper and lower edges, the triangular shaped plate has three edges, and the means for joining connects the respective edges of the triangular shaped plates to the upper and lower edges of the struts to form a sealed joint therealong and the sealed, internally pressurized, gas receiving and captivating compartment. The compartment is filled with a gas under pressure, which acts to place a normal force on and force the struts and the plates outwardly and away from the triangular shaped element.

According to another aspect of this embodiment of the invention, the first means for interconnecting the vertices of adjacent triangular shaped elements to one another comprises the vertices forming hinge elements.

According to yet another aspect of this embodiment of the invention, the second means for interconnecting the triangular shaped elements to the first wall comprises connector pins for interconnecting the vertices, at least in part, to the first wall, wherein a first plate of the pair of plates that forms each of the plurality of triangular shaped elements is juxtaposed against the first wall, the first and second wall have a predetermined shape and contour, and the vertices are disposed on the contour of a surface that defines the shape of the outer hull.

The sealed compartment formed in part between the two triangular shaped walls is filled with a volume of pressurized air and provides buoyancy to the vehicle when the hull of the vehicle is in the water.

According to another embodiment of this invention, a vehicle comprises: an outer hull enclosing a volume of gas under a first pressure, said hull formed at least partially by an outer wall of fluid impervious material, and an inner wall comprising an array of inflatable multi-wall triangular shaped cell elements, each cell element defining a sealed space for enclosing a gas under a second pressure different than said first pressure and characterized in that each cell element is pressurized, and means for controlling said first and second pressure.

According to this embodiment of the invention, the hull forms the outer structure and shape of an airship, lighter than air and adapted to rise above the ground.

According to an embodiment of this invention, a boat operable to float in water comprises: a hull having a forward end and an aft end, said hull being at least partially constructed of a plurality of sections coupled together to enclose a volume of air sufficient to provide buoyancy to the boat, the hull of at least one section being defined by a fluid impervious outer skin and an inner wall formed of a plurality of interconnected inflated multi-wall cells of compliant material, each cell defining a sealed pressurized compartment between at least two walls thereof, the compartments filled with a pressurized gas, and the array of cells being connected to the outer skin with one of said two walls being juxtaposed thereagainst.

According to an aspect of this latter embodiment of the invention, the cells preferably have substantially the same shape and/or volume, may be individually pressurized to a desired pressure, and the inflated, pressurized cells assist in reinforcing the wall structure as well controlling the buoyancy of the vehicle.

Advantageously, the triangular element having an enclosed pneumatically reinforced compartment will push out on all sides of the compartment. In a curved structure, the pressure acts in three ways: outward, inward and to the sides. The outward pressure acts to strengthen the structure by directly opposing any normal load on the structure. The inward pressure acts to make the structure weaker. The pressure to the sides would act to strengthen the structure; each compartment pushes against its neighbors to distribute the load. If they push harder against one another, the structure gets stronger. The net result of the outward, inward and side pressure is a force pushing outward, reinforcing the structure.

Advantageously, the inflated pneumatically pressurized triangular shaped cells enable larger structures to be made out of lighter materials, such as lightweight aluminum and plastic.

Advantageously, such method herein of forming a triangular structural element with sealed pressurized compartment may be applied directly to the construction of air supported structures, such as those characterized as a geodesic dome, wherein the air pressure inside and outside of the dome is the same.

The present invention will be more clearly understood with reference to the accompanying drawings and to the following Detailed Description, in which like reference numerals refer to like parts and where:

DETAILED DESCRIPTION OF THE PREFERED EMBODIMENT

Figure 1:
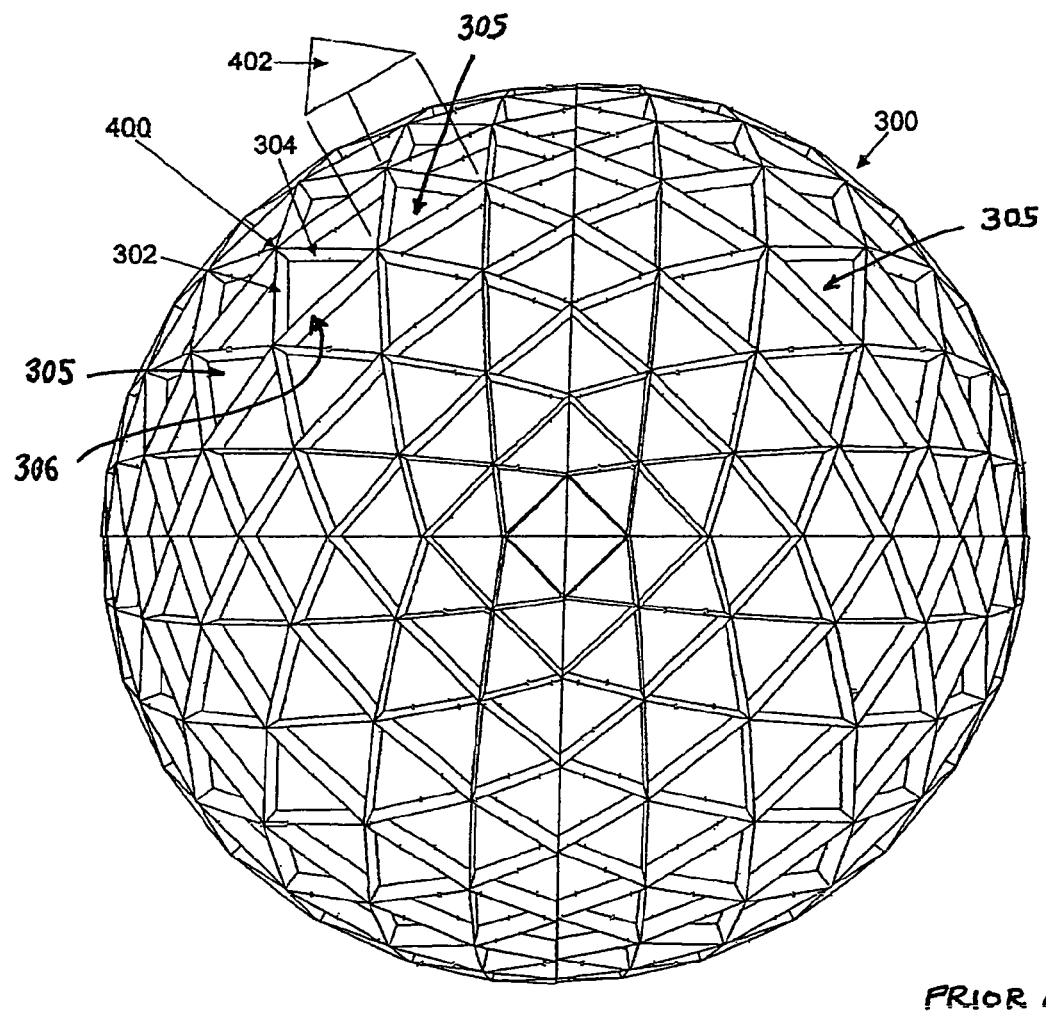
FIG. 1 is a perspective view of a geodesic dome of the prior art, the dome being formed by struts being connected into an array of triangular shaped elements.
Figure 2:
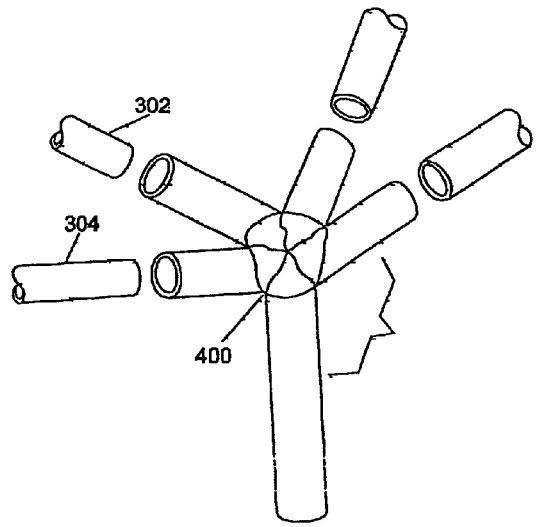
FIG. 2 illustrates the dome of FIG. 1 and the fastening of the struts to one another.

Referring now to the drawings, FIGS. 1 and 2 illustrate a geodesic dome 300 and method of construction described in U.S. Pat. No. 6,295,785. The term geodesic dome refers to a structure approximating a sphere or portion thereof, such as a hemisphere or a portion thereof, a quarter sphere, or another portion of a sphere.

As shown in FIG. 1, a plurality of struts 302, 304, 306, etc. are fastened to one another and formed into an array of interconnected triangular shaped elements. The struts 302, etc. are comprised of any suitable material, such as aluminum steel, a hard composite material, extruded hard plastic, wood, or the like.

As shown, the struts 302, etc. are generally flat and rectangular and the widths of the struts are substantially the same. The lengths of the plurality of struts 302, etc. may vary relative to one another, but preferably all of the struts are substantially the same length. Further, the struts 302, etc. may be straight or arcuate, at the option of the user, but the struts should be either all straight or all arcuate, and if arcuate, the radius of curvature of all the struts should be equal.

A covering or panel 402 made of any suitable material, depending on the application, may be placed over or under the framework to cover same.

FIGS. 1 and 2 illustrate at 400 a suitable arrangement for angularly fastening the struts 302, etc. together.

The exact means 400 for fastening the struts 302, etc. to one another or the panels 402 to the struts will vary depending on the application, and various arrangements are disclosed in U.S. Pat. Nos. 2,682,235; 2,914,074; 3,197,927; 3,203,144; 4,719,726; 4,679,361; 4,723,382; and 5,114,047, the disclosures of which incorporated herein by reference.

According to this invention, an improved composite wall structure is disclosed, the wall structure having application for the geodesic dome 300 as shown and described in FIGS. 1 and 2, and to the contoured hull of a vehicle adapted to operate either in a water environment, such as a submarine or like submersible and/or boat operated atop a body of water, or in the air, such a rigid-walled lighter than air airship.

As will be described in greater detail herein below, the composite wall structure, when used as the hull of a vehicle, comprises a sheet of fluid impervious material, a plurality of struts and triangular shaped wall panels, means for connecting the struts and wall panels together and into an array of triangular shaped cells, wherein the array of interconnected cells form a first wall, each cell comprising first and second wall panels connected along their edges to a respective of three struts wherein to form a sealed internally pressurized compartment, and means for connecting the first wall to the sheet in a manner wherein the sheet is juxtaposed against the first wall panels.

The outer sheet of fluid impervious material may not be needed in constructing the geodesic dome, the array of internally pressurized triangular compartments or cells and the wall panels thereof and fastening arrangement being sufficient in some applications.

Figure 3:
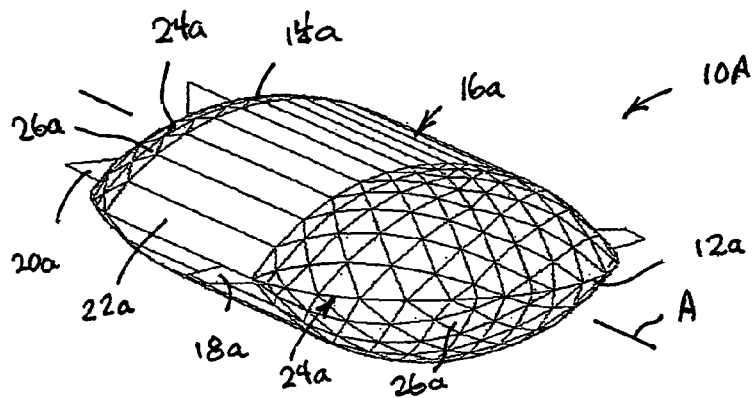
FIG. 3 is a perspective view of a vehicle that is submersible in water, such as a submarine, with a portion of the outer hull of the vehicle having been cut away to show details of the hull structure of the vehicle according to the present invention.
Figure 4:
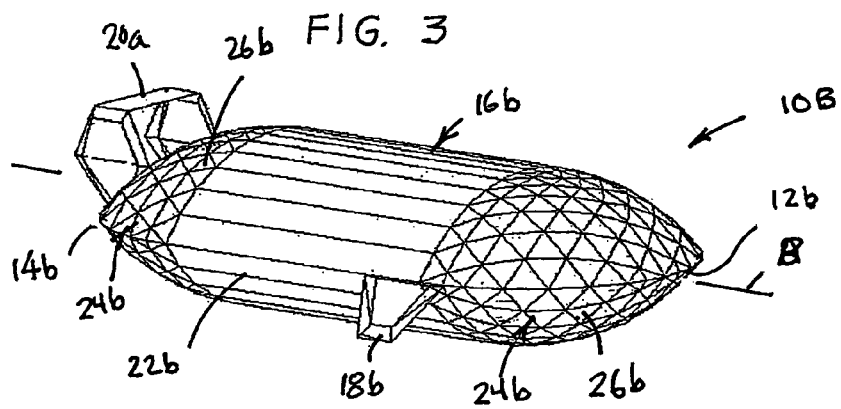
FIG. 4 is a perspective view of a vehicle that is lighter than air, such as an airship, with a portion of the outer hull of the vehicle having been cut away to show details of the hull structure of the vehicle according to the present invention.

According to this invention, FIG. 3 shows a submersible vehicle, indicated by the number 10A, and FIG. 4 shows a lighter than air vehicle, indicated by the number 10B.

Each vehicle 10A and 10B is generally longitudinally extending, symmetrically disposed along a respective longitudinal axis A and B extending between a forward end 12a and 12b and an aft end 14a and 14b, respectively, of the vehicle 10A and 10B. Each respective vehicle 10A and 10B includes a composite hull structure referenced generally by numeral 16a and 16b and various control members, such as fins 18a and 18b or rudders 20a and 20b to control direction of movement of the vehicle. These elements and their function are conventional and form no part of this invention.

In each illustrated vehicle embodiment, the hull structure 16a and 16b is partially cut away and includes an outer skin or shell 22a and 22b and an inner wall 24a and 24b formed by an array of interconnected polyhedral elements 26a and 26b that are assembled to one another and the assembly or wall 24a and 24b connected to the outer skin 22a and 22b. Preferably, the polyhedral elements 26a and 26b are triangular shaped, such as the triangular elements 302, etc. and described below. The contour, shape, and dimensions of the hull structure 16a and 16b, operating height or depth of the vehicle will determine the dimensions of the polyhedral elements and/or their method of assembly.

The hull structure 16a and 16b is the same for each vehicle 10A and 10B and defines an interior volume filled by air.

In the case of the submarine or submersible 10A, the vehicle submerges, at least in part, into a body of water wherein an increasing radial inward compressive hydrodynamic force is on and about the entire exterior surface of the hull 16a. The polyhedral elements 26a of the inner wall 24a and the outer skin 22a must be sufficiently rigid to resist inward buckling caused by water forces. Submarine personnel are within the sealed interior volume of the submersible. Although shown and described herein as a submersible or submarine, the hull structure 16a may equally comprise the hull of a boat adapted to float atop a body of water.

Similarly, the interior volume of the airship 10B is filled with a gas that is lighter than air wherein to lift the airship and pressurized, and the hull structure is encircled by air at atmospheric pressure and must resist the outward radial force acting on the surface of the hull.

FIG. 3 shows an enlarged portion of the hull structure 16a of the submersible vehicle 10A. In operation, the submarine 10 is adapted to have sufficient buoyancy to float above, at least in part, atop a body of water and also to be able to submerge below the surface of the body of water. Depending on the application, the hull structure 16a may have to withstand a significant inward hydrodynamic pressure placed about the exterior if the vehicle.

Referring to FIG. 4, an embodiment of a lighter than air vehicle 10B of the present invention is shown with portions of the hull structure 16b cut-away to show detail thereof. In the illustrated embodiment, the lighter than air vehicle 10B is in the form of what is referred to in the art as an air ship, dirigible, and the like, and has a reinforced hull. In operation, the interior of the airship 10B is adapted to be lighter than air and rise above and float above the ground. The interior of the hull structure is subject to an air pressure to enable the vehicle to rise.

In each of the vehicles 10A and 10B, the hull structures are subjected to a generally continuous 360° pressure or normal force, either directed inwardly in the case of the submersible vehicle 10A or outwardly in the case of the lighter than air vehicle 10B. In the discussion that follows, the discussion will be directed to the hull assembly 16a, although the discussion is also applicable to the wall structure of a geodesic dome and that of the airship 10B, except as noted.

However, it is to be understood that the present invention is not limited to this construction. Accordingly, the scope of the present invention should be considered in light of a variety of alternative embodiments and/or additional features that will be discussed further below.

Figure 5:
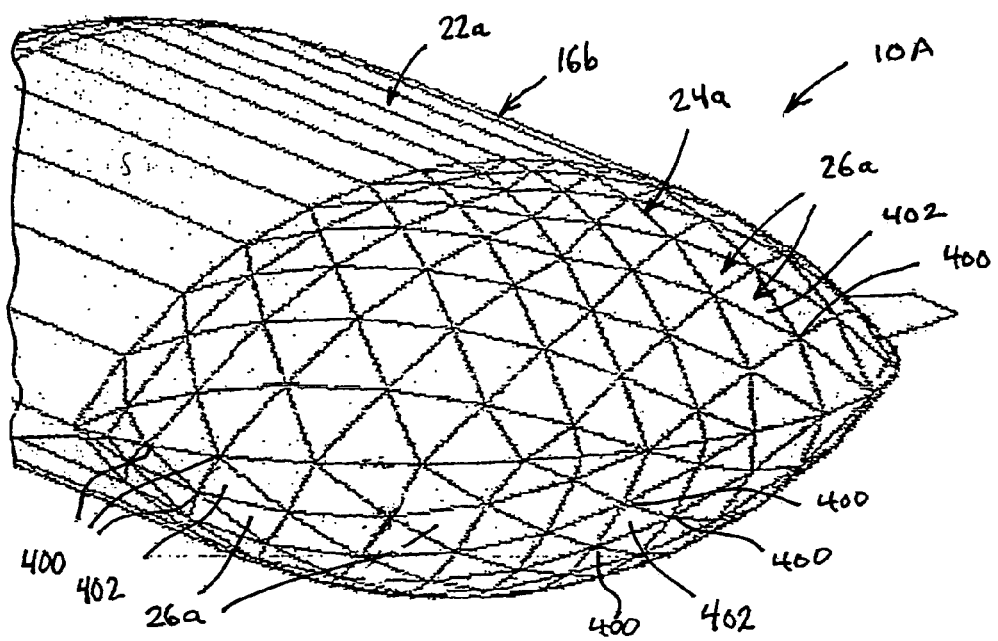
FIG. 5 is an enlarged view of the hull structure of the vehicle shown in FIG. 3 according to this invention.

Referring to FIG. 5, the composite hull assembly 16b comprises the outer wall 22a and the inner wall 24a constructed from a plurality of coupled triangular shaped elements 26a. Each triangular shaped element 26a defines a polyhedral shaped element having an exterior shape and an interior volume so that a continuous volume is defined within the hull assembly 16a. The particular outer shape or inner volume of each of the elements 26a is not a limitation of the present invention. For example, each of the elements 26a can define an outer shape and inner volumetric shape that is cylindrical, rectangular, triangular, octagonal, etc. Further, each section 26a can have the same shape or a different shape. In this way, the overall inner volumetric shape and outer shape of hull assembly 16a can be tailored for a specific application.

The inner volume of hull assembly 16a can be continuous or could alternatively be divided up into compartments using bulkheads. Note that the number of bulkheads and their position in hull assembly 16a is not a limitation of the present invention. Depending on the application, the bulkheads may be eliminated, thereby reducing the weight of the submersible, and the use of radar recognizing materials used in the submersible.

Figure 6:
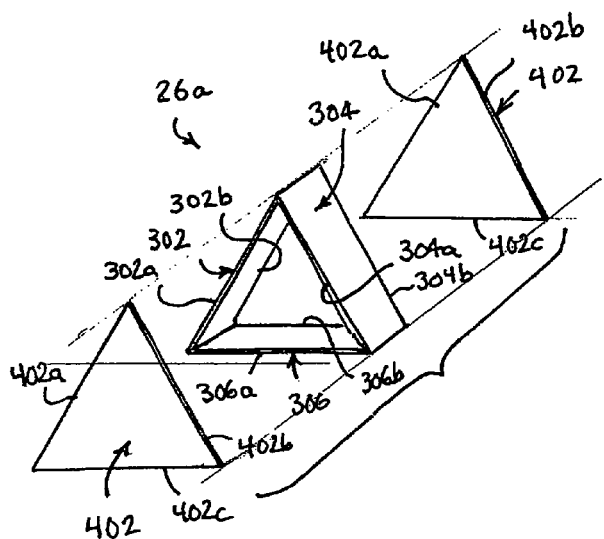
FIG. 6 is an exploded view of a pneumatically reinforced triangular shaped structural element according to this invention, such as used in forming the geodesic dome shown in FIG. 1, or the submarine shown in FIG. 3, and the airship shown in FIG. 4.
Figure 8:
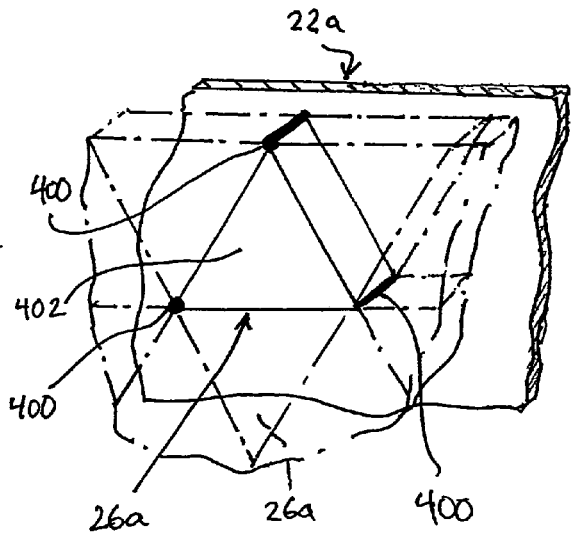
FIG. 8 is perspective view illustrating an array of triangular shaped structural elements of FIG. 7 that are connected to one another and form a wall and positioned for connection to a fluid impervious wall.

Each of the triangular shaped elements 26a is constructed in a similar fashion. Accordingly, a description of one triangular shaped element 26a applies equally to each of the remaining sections. In describing element 26a, simultaneous reference will be made to FIG. 6, which is an exploded assembly view of the element 26a, and FIG. 7, which is an elevation view, partially cut-away to show detail of the pressurized compartment formed in the element 26a.

The triangular element 26a is similar to the element 305 described above and comprises three struts 302, 304, and 306 and a pair or triangular shaped panels or plates 402. The struts 302, 304, and 306 are generally flat, rectangular shaped, substantially of the same width, and connected together at opposite respective ends into the form of a triangle. The strut 302 has upper and lower edges 302a and 302b, the strut 304 has upper and lower edges 304a and 304b, and the strut 306 has upper and lower edges 306a and 306b. As above noted, the struts may be straight or arcuate.

The panels 402 are generally flat, planar, and connected along their three sides or edges 402a, 402b, and 402c to a respective upper and lower edge of the struts wherein to be spaced form one another and form a three dimensional triangular shaped sealed chamber or compartment 308 of predetermined volume. For example, the upper and lower edges 302a and 302b of the strut 302 are connected, respectively, to the edges 402a of one and the other of the plates 402. The upper and lower edges 304a and 304b of the strut 304 are connected, respectively, to the edges 402b of one and the other of the plates 402. Finally, the upper and lower edges 306a and 306b of the strut 306, respectively, are connected to one and the other of the plates 402.

The means used to fasten the panel 402 to the triangular shaped framework is dependent on the materials used for the covering and the struts 302, etc. For instance, if both are made of a plastic, an epoxy adhesive could be used to fasten the covering panels 402 to the struts 302, etc. The covering panels 402 are preferably resistant to fluid penetration, yet compliant and flexible.

The sealed triangular elements 26a thus formed are connected to one another in a manner described herein above. The fastening means 400 may comprises a plurality of flexible ties or links.

For underwater usage, it is desirable that the materials used for the outer wall 22a, the triangular elements 26a, and connecting the panels to the struts and the struts to one another be both strong and resistant to abrasion damage.

In each of the vehicles 10A and 10B, the hull structure is shaped to enclose a specific volume of gas. In each, the outer wall 22a is airtight, watertight, and impervious to fluid penetration.

In the case of the airship 10B, the outer wall 22b may be of an inflatable multi-wall fabric that encloses a shaped volume and formed from at least one sheet of flexible airtight and watertight material(s). Similarly, the panels 402 of the interior wall 24b may be formed from one or more flexible airtight and watertight material(s).

A variety of sealed fabric construction techniques can be used to make the triangular elements 26a. Each of the panels 402 can be realized by a single fabric layer or multiple material layers.

Figure 7:
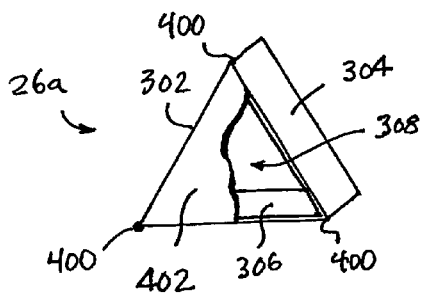
FIG. 7 is an elevation view of the triangular shaped structural element of FIG. 6, when assembled, and partially cut away to illustrate a fluid pressure compartment formed by the assembly.

The sealed space 308 is filled/pressurized with a gas wherein to provide an inflated shape shown in FIG. 7. The selective filling/pressurization of sealed space 308 controls the buoyancy of the array of triangular shaped elements 26a of the submersible 10A.

To fill some or all of the sealed spaces or compartments 308 with air, a tank or other source of pressurized air (not shown) is coupled to the sealed compartment 308 via a valve (not shown). The valve can be installed using one wall 402 or both walls 402, as understood by those skilled in the art. The valve provided in the panel 402 can be controllable to vent the sealed space 308 as needed. The valve could also incorporate a pressure relief feature to prevent over inflation of sealed space 308.

Since each of the triangular shaped elements 26a may be equipped for their individual inflation, the hull structure for the submersible vehicle 10A is provided with buoyancy control. That is, the vehicle 10A can be floated, submerged and trimmed by controlling the buoyancy in each of the internally pressurized triangular shaped elements 26a.

To aid in the manufacturing process, the curved surface(s) of the geodesic dome 300 and hull structure of the vehicles 10A and 10B may be constructed in subparts, such as half domes, quarter domes, eighth domes, and the like. The subparts of each curved surface 300, 10A, and 10B may be constructed using the process described in the aforesaid U.S. Pat. No. 6,295,785 and the subparts thus formed then fastened to each other by the means for fastening 400.

Similarly, each subpart of a geodesic dome 300 or vehicle 10A and 10B may be formed of fractional sections that are then fastened to each other to form the subpart, each fractional section being patterned after a portion of a substantially curved surface.

The exact number of subparts of the geodesic dome and vehicles and/or fractional sections of each subpart is not important, nor is the order in which the subparts and/or fractional sections are fastened to each other, as long as the final pattern when all the subparts and fractional sections are joined together is the pattern of the curved surface of the dome 10 or vehicles 10A and 10B.

The advantages of the present invention are numerous. A submersible vehicle can be lighter than existing submersibles. The reduced weight of the vehicle provides greater operational speed and range.

The present invention makes use of very lightweight and very strong inflatable unibody fabrication to effect a very strong yet lightweight hull that can be produced more efficiently and consistently that in traditional welded chassis construction without the need for metals that corrode in a seawater environment.

Depending on the application, certain internal reinforcement bulkheads may not be needed. If internal bulkheads are not required, there is more space available for passengers and equipment. Further, the hull structure could possibly be constructed of metals and materials that are "invisible" to radar. The elimination of most metal from the hull assembly means that it is less susceptible to corrosion than most rigid hulls.

Although the invention has been described relative to specific embodiments thereof, there are numerous variations and modifications that will be readily apparent to those skilled in the art in light of the above teachings. It is therefore to be understood that, within the scope of the appended claims, the invention may be practiced other than as specifically described.

What is claimed is:

1. A wall structure, comprising:
   a plurality of triangular shaped cells, each cell being formed by three sidewalls, and first and second closure panels,
   first means for connecting the sidewalls into a plurality of three dimensional triangular shaped frames having opposite sides,
   second means for connecting the closure panels to the triangular shaped frames to form a plurality of triangular shaped cells, each cell forming a sealed interior chamber,
   third means for connecting the vertices of the triangular shaped cells to one another in a manner to form a composite array wherein the first closure panels of the cells form a substantially continuous surface of desired shape and contour,
   fourth means for pressurizing and controlling the pressure of the interior chamber of each said triangular shaped cell to a desired pressure,
   a wall cover adapted to substantially cover the continuous surface formed by the first closure panels of said composite array, and
   means for securing said wall cover to substantially cover the continuous surface of said composite array.

2. The wall structure of claim 1, wherein the triangular shaped cells are substantially the same as one another in size and shape.

3. The wall structure of claim 1, wherein:
   each said sidewall is generally planar, rectangular, and has opposite ends,
   said first means for connecting operates to secure the opposite ends of respective pairs of sidewalls together to form triangular frames having opposite sides,
   each said closure panel is generally planar, triangular, and has three edges, and
   said second means for connecting operates to secure the edges of the closure panels, respectively, to one and the other opposite sides of the respective triangular frames and form the sealed chambers of said cells.

4. A vehicle, said vehicle being submersible, at least in part, in a water environment, or being lighter than and operable in an air environment, said vehicle comprising:
   a contoured outer hull having a central longitudinal axis and forward and aft ends disposed along the axis, said outer hull enclosing a volume of air or gas and a surface of the hull being adapted to be subjected to an interior or exterior pressure exerted on the surface during normal operation in said environment,
   said outer hull including a first wall impervious to fluid penetration and a second wall,
   said second wall comprising:
   an array of triangular shaped cells, each individual cell forming a sealed gas compartment internally pressurized to a predetermined level sufficient to retain the integrity of the cell form when subjected to pressure during operation, first means for interconnecting the vertices of adjacent triangular shaped cells to one another and forming at least one substantially uniform continuous surface, and second means for joining the first wall to the continuous surface of said array of triangular shaped cells and forming a 360° sealed closure therewith and therebetween.

5. The vehicle according to claim 4, wherein the triangular shaped cell comprises:

first and second triangular shaped plates and three rectangular shaped struts, each strut extending between opposite end portions, means for connecting the opposite end portions of the struts to one another and into a three dimensional triangular shaped frame having opposite lateral sides, and means for joining the triangular shaped plates to the respective lateral sides of the triangular shaped frame in a manner to form a sealed joint between the plates and struts and a sealed interior compartment.

6. The vehicle according to claim 5, wherein the sealed interior compartment is internally filled with a gas under pressure, which acts to force the struts and the plates outwardly and away from the triangular shaped cell.

7. The vehicles according to claim 4, wherein said first means for interconnecting the vertices of adjacent triangular shaped cells to one another comprises the vertices forming hinge elements.

8. The vehicle according to claim 7, wherein each respective plate and strut is comprised of a compliant material and has generally planar first and second surfaces, the first surfaces of the plates and struts form the exterior surface of the cell with which associated, the first surfaces of the first triangular shaped plates forming said substantially continuous surface, and said second means for joining the first wall to the triangular shaped elements comprises connector pins for interconnecting the vertices, at least in part, to the first wall, the first wall being juxtaposed against substantially continuous surface formed by the first surfaces said first triangular shaped plates.

9. The vehicle according to claim 8, wherein the first and second wall have a predetermined shape and contour, and the vertices are generally perpendicular to the contour of the continuous surface that defines the shape of the outer hull.

10. The vehicle according to claim 4, wherein the sealed compartment is filled with a volume of pressurized air and provides buoyancy to the vehicle when the hull of the vehicle is in the water.

11. A boat operable in water, at least in part, to float and submerge, comprising a hull having a forward end and an aft end, said hull being at least partially constructed of a plurality of sections coupled together to enclose a volume of air sufficient to provide buoyancy to the boat, the hull of at least one section being defined by a fluid impervious outer skin and an inner wall formed of a plurality of interconnected inflated multi-wall cells of compliant material, each cell defining a sealed pressurized compartment between at least two walls thereof, the compartments filled with a pressurized gas, and the array of cells being connected to the outer skin with one of said two walls being juxtaposed thereagainst.

12. The boat according to claim 11, wherein the cells preferably have substantially the same shape and/or volume and individually pressurized to a desired pressure, the inflated, pressurized cells assisting in reinforcing the wall structure as well controlling the buoyancy of the vehicle.

13. The boat according to claim 12, further including means for controlling the pressure in said cells, wherein the pressure is sufficient to push outwardly against compliant material forming the sides of the sealed compartment.

14. The boat according to claim 13, wherein at least one section of the hull is in the form of a curved structure, the pressure in the sealed compartments of said section forcing the compliant material outward, inward and to the sides and cooperating to provide a resultant force that reinforces the hull structure.

15. The boat according to claim 13, wherein the compliant material of the outer hull is comprised of a lightweight material, said material selected from the group of lightweight aluminum and plastic.

* * * * *